United States Patent [19]
Fields

[11] 3,807,878
[45] Apr. 30, 1974

[54] OPTICAL DENSITOMETER FOR INDICATING THE OPTICAL DENSITY AND RATE OF CHANGE OF THE OPTICAL DENSITY OF A SPECIMEN

[76] Inventor: Louis G. Fields, 11662 Sunset Blvd., Los Angeles, Calif. 90049

[22] Filed: Oct. 16, 1972

[21] Appl. No.: 101,010

Related U.S. Application Data
[63] Continuation of Ser. No. 656,431, July 27, 1967, abandoned.

[52] U.S. Cl.................. 356/206, 250/210, 250/218
[51] Int. Cl. ........................................... G01n 21/24
[58] Field of Search............................ 250/210, 218; 356/39–42, 51, 94, 95, 201–206

[56] References Cited
UNITED STATES PATENTS

| | | | |
|---|---|---|---|
| 3,463,927 | 8/1969 | Allington | 356/206 X |
| 3,241,431 | 3/1966 | Brutten et al. | 356/206 |
| 2,872,588 | 2/1959 | Barton | 250/210 |
| 3,364,811 | 1/1968 | Baruch et al. | 356/95 |
| 3,458,287 | 7/1969 | Gross et al. | 356/39 |
| 3,490,875 | 1/1970 | Harmon et al. | 356/205 |
| 2,984,146 | 5/1961 | Kwart et al. | 356/51 |

OTHER PUBLICATIONS
Knutsen et al., Scandanavian Journal of Clinical and Laboratory Investigation, December 1966, pages 673–678.

Primary Examiner—Ronald L. Wibert
Assistant Examiner—F. L. Evans
Attorney, Agent, or Firm—Smyth, Roston & Pavitt

[57] ABSTRACT

This invention relates to a system for measuring and recording the optical density of a specimen. In particular, the invention relates to a measuring system including means for providing an automatic balance in the optical density measuring system and wherein the automatic balance of the measuring system also controls output means to provide for a reading of the optical density of the specimen, the change in optical density over a predetermined time interval, and also to graphically record and display in analog and digital form the optical density and the rate of change of the optical density. The invention also includes means for providing an automatic zero balance of the measuring system prior to the measurement of the optical density.

12 Claims, 12 Drawing Figures

INVENTOR:
Louis G Fields

By Smyth, Roston & Pavitt
ATTORNEYS

INVENTOR:
Louis G Fields

ATTORNEYS

INVENTOR:
Louis G. Fields

ATTORNEYS

OPTICAL DENSITOMETER FOR INDICATING THE OPTICAL DENSITY AND RATE OF CHANGE OF THE OPTICAL DENSITY OF A SPECIMEN

This is a continuation of application Ser. No. 656,431, filed July 27, 1967, now abandoned.

It is often desirable to measure the optical density of a specimen. For example, there are chemical tests wherein a particular reagent is added to a mixture and the rate at which the particular reagent reacts with the mixture may be measured by the change in the optical density of the mixture. The measurement of optical density may be provided for by a light source having a particular wavelength of light energy wherein the particular wavelength of light energy is predetermined by a wavelength of light energy which is absorbed by the particular reagent or other component within the mixture. This type of measurement is widely used in medicine wherein the reagent is mixed with a specimen or serum prepared from a sample taken from the patient and whereby a chemical reaction occurs within the specimen. The reaction involves the component portion of the mixture which is to be measured and wherein the component portion to be measured is either produced or consumed during the reaction. The component portion either being consumed or being produced has an absorption line for light energy at a particular wavelength and therefore, the measurement of the optical density of the specimen at that particular wavelength is a direct indication of a particular chemical property of the specimen.

Sometimes the chemical property which is to be measured is the final optical density of the specimen after the chemical reaction has stabilized. Other times it is important to know the rate of change of the chemical reaction which is measured in accordance with the rate of change of the optical density of the specimen after the rate of change of the chemical reaction has stabilized. The present invention includes means for providing output indications of the optical density of the specimen and of the rate of change of the optical density and wherein the output indications are automatically provided as the measurement system of the present invention is balanced through a servo-system.

One problem which has been encountered in the measurement of the optical density of chemical specimens as described above is that it is often desirable to provide for a measurement of optical density at very high values of optical density. Unfortunately, the changes in optical density of the specimen do not produce linear changes in the amount of light energy which pass through the specimen. For example, assuming a fixed light source radiating light energy of a fixed intensity toward the specimen, as the optical density of the specimen changes linearly, the light output from the specimen changes non-linearly. The non-linearity of the light output is severe at high optical densities since the non-linearity is greatest at high optical densities.

The problem of non-linearity has been overcome by using the unique properties of a photoresistive cell. Although the output curve of the photoresistive cell has a linear portion whereby linear changes in light energy impinging on the photoresistive cell produce linear changes in resistance, the present invention uses the non-linear portion of the output curve of the photoresistive cell.

In particular, the present invention uses the non-linear portion of the output curve of the photoresistive cell which approximately compensates for the non-linear output of light energy through the specimen. The total combination of the non-linear characteristics of the photoresistive cell and the non-linear characteristics of light energy passing through the specimen is adjusted so as to provide for a linear change in resistance of the photoresistive cell with linear changes in optical density of the specimen. A fuller description of the use of the photoresistive cell may be had with reference to copending application No. 340,943 filed Jan. 29, 1964, in the name of Louis G. Fields, now issued into U.S. Pat. No. 3,625,621, on Dec. 7, 1971.

The present invention provides for improvements in the system disclosed in U.S. Pat. No. 3,625,621 and includes substantial improvements in the measuring techniques. For example, in the system of the present invention the specimen to be measured is prepared and placed in a container such as a cuvette. The cuvette is inserted into a holder and as the cuvette is initially received in the holder a first switch is activated which provides for an automatic zero balance of the measurement system. The measurement system of the present invention may consist of an electrical resistance bridge which includes the photoresistive element as one leg of the bridge and wherein the bridge also includes variable resistors for balancing the bridge. The output from the bridge indicates the imbalance of the system and the output of the bridge is used to control a servo-motor. The servo-motor in turn adjusts one of the variable resistors contained in the bridge so as to provide for a balance in the system.

As the cuvette containing the specimen is initially inserted into the holder, so as to activate the first switch, the servo-motor adjusts a first variable resistance element which provides for a balancing of the bridge for the nominal value of resistance of the photoresistive cell. The nominal value of resistance of the photoresistive cell is equal to the resistance of the photoresistive cell before the specimen is interspersed between the light source and the photoresistive cell. When the specimen is fully inserted into the bridge, a second switch is activated so that the servo-motor controls a second variable resistance element to provide for a balance of the bridge in accordance with the optical density of the specimen.

The optical density may be read out directly from the measurement system of the present invention by providing for a counter connected to the servo motor so that the servo-motor automatically controls the counter at the same time the servo-motor balances the bridge. In addition, a second counter may be coupled to the servo-motor and the second counter may also be coupled to a timer so as to indicate a change in the optical density over a predetermined time interval. In addition to the above it is often desirable to provide for an indication of the change in the optical density over a predetermined time interval for either plus or minus changes of the optical density. These plus and minus indications may be provided for through the use of a bidirectional servo-motor controlling a pair of counters or through the use of a pair of servo-motors which rotate in opposite directions and with each servo motor controlling an individual one of a pair of counters.

At the same time the instrument of the present invention provides for an output indication of the optical density of the specimen through the use of the counter, a graphic record of the optical density may also be provided for by a pen recorder. The pen recorder may be driven by the same servo-motor which controls the optical density counter. The pen recorder provides for the graphic record of the optical density over any desirable length of time. The present invention may also provide for a graphic record of the rate of change of the optical density. Both the optical density and the rate of change of the optical density may be recorded by a single pen recorder using a particular embodiment of the invention. The particular graphic record of the optical density and the rate of change of the optical density appear as dotted or dashed lines whereby the dashes alternate between the two lines of information. A clearer understanding of the invention will be had with reference to the following description and drawings wherein:

Figure 1:
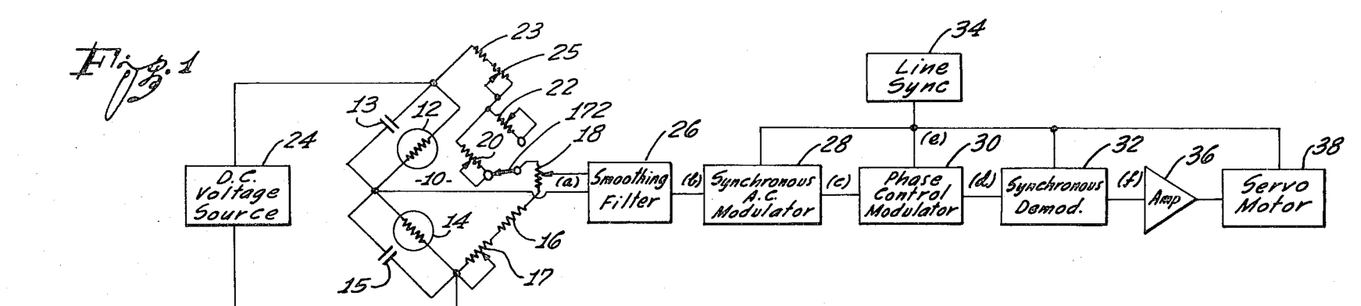
FIG. 1 is a block diagram of a portion of the measurement system of the present invention.

In FIG. 1, an electrical bridge 10 includes a pair of photoresistive elements 12 and 14, each paralleled by capacitors 13 and 15. The bridge 10 also includes a resistor 16 in series with a trimmer potentiometer 17, a zero balancing potentiometer 18, a compensation potentiometer 20, a measurement potentiometer 22 and a resistor 23 in series with a trimmer potentiometer 25. The capacitors 13 and 15 are used as smoothing filters to reduce ripple in the photoresistive elements. The ripple may be present if the light impinging on the photoresistive elements is operated from an alternating current source. The use of the capacitors 13 and 15 is also helpful since the ripple is more serious at the low light levels which may be present with the use of the measuring system of the present invention. The resistor 23 and the trimmer potentiometers 25 and 17 are included for adjustment and balancing of the particular arms of the bridge 10.

A d-c voltage source 24 is connected across the electrical bridge 10 to produce an output signal across the terminal between the photoresistive cells 12 and 14 and the arm of the zero balance potentiometer 18. It is to be appreciated that other means may be used in place of the zero balance potentiometer. For example, a mechanical shutter may be used to control the light to either or both of the photoresistive elements 12 and 14 so as to produce a zero balance of the bridge 10. The output signal from the electrical bridge 10 is applied to a smoothing filter 26. The output from the smoothing filter in turn passes through a synchronous a-c modulator 28, a phase control modulator 30 and a synchronous demodulator 32 and wherein a line voltage 34 is coupled to the elements 28, 30 and 32.

The output from the synchronous demodulator 32 is applied to an amplifier 36 which drives a servo-motor 38. The servo-motor 38 in turn is mechanically coupled back to the bridge 10 to provide for a balancing of the bridge. Specifically, the servo-motor 38 is mechanically coupled to control the zero balance potentiometer 18 and the measurement potentiometer 22 at different times and the particular sequence of control will be explained in greater detail.

Figure 2:
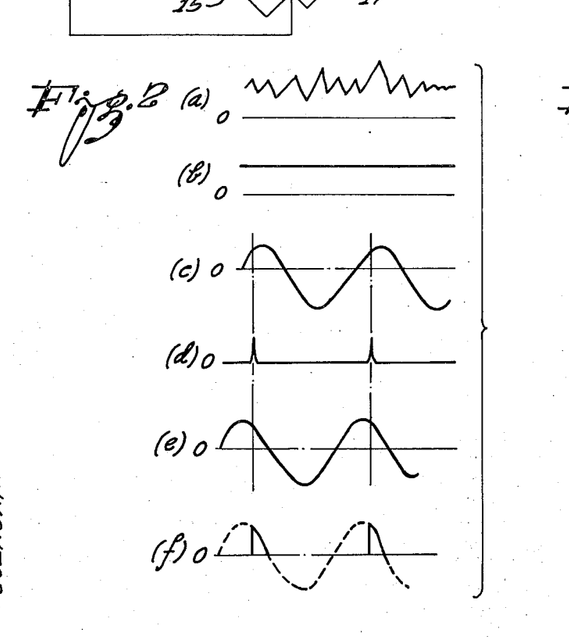
FIG. 2 is a series of curves relating to the waveforms appearing at various places in the system of FIG. 1.

FIG. 2 illustrates a series of curves explaining the operation of the system of FIG. 1 when an output signal is produced by the bridge 10. The letters (a) through (f) on FIG. 1 correspond to the letters (a) through (f) of FIG. 2 and indicate the various waveforms at corresponding points in the system of FIG. 1. The output signal from the bridge is shown in FIG. 2 (a) and as can be seen in FIG. 2 (a) the output signal is usually a signal which varies around a d-c level. The output from the smoothing filter is shown in FIG. 2 (b) and it can be seen that the smoothing filter provides for an elimination of the alternating portion of the output of the bridge 10 and the smoothing filter passes only the d-c level.

The output from the smoothing filter 26 is then applied to the synchronous a-c modulator 28. The modulator 28 is a chopper which may use, for example, a field effect transistor or a photo chopper in a known manner so as to provide an alternating output signal having an amplitude in accordance with the amplitude of the output signal from the smoothing filter 26 and having a phase in accordance with the polarity of the output from the smoothing filter. The output from the synchronous a-c modulator is shown in FIG. 2 (c). The synchronous a-c modulator is also synchronized by the line voltage 34 and the frequency of the output signal forms the modulator 28 is in accordance with the line frequency. The output from the line 34 is shown in FIG. 2 (e).

As indicated above, the output from this synchronous a-c modulator 28 is an alternating signal having an amplitude in accordance with the amplitude of the signal from the smoothing filter 26 and having a phase in accordance with the polarity of the signal from the smoothing filter 26. The output from the synchronous a-c modulator is then applied to a phase control modulator 30. The phase control modulator 30 is a circuit which fires to produce a pulse in a known manner when the magnitude of the input signal reaches a predetermined level. For example, the phase control modulator 30 may include a unijunction switch to produce the pulse signal. The output from the phase control modulator 30 is a series of pulses and wherein a pulse appears each time the amplitude of the signal from the phase control modulator 30 reaches the predetermined level. The position of the pulses as shown in FIG. 2(d) is in accordance with the amplitude and phase of the signal from the synchronous a.c. modulator 28 since the amplitude and phase of the signal from the synchronous a.c. modulator 28 both determine when the predetermined level for the input signal to the modulator 30 is reached. The phase control modulator 30 is also synchronized by the line 34.

The output from the phase control modulator 30 is applied to the synchronous demodulator 32. The synchronous demodulator 32 also includes the line 34 as an input. The synchronous demodulator 32 fires in a known manner each time a pulse appears and the synchronous demodulator allows the line voltage 34 to pass as an output signal for a period of time until the polarity of the line voltage changes. This may be seen in FIG. 2(f) where the shaded areas represent signals passed by the synchronous demodulator 32. The output from the synchronous demodulator 32 is, therefore, in accordance with the imbalance in the system and specifically the imbalance in the bridge 10. The output from the synchronous demodulator 32 is then applied to the amplifier 36 to control the servo-motor 38 to rebalance the bridge 10.

Figure 3:
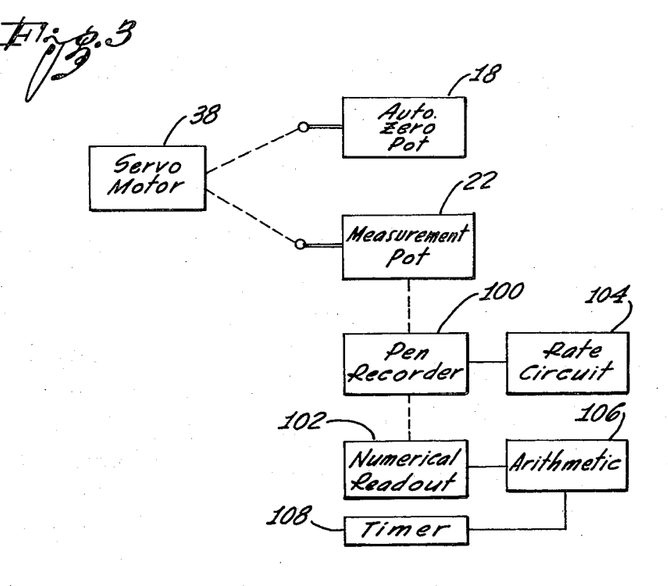
FIG. 3 is a block diagram of a further portion of the measurement system of the present invention.

Specifically, the servo-motor 38 as shown in FIG. 3 may be used to mechanically control the automatic zero potentiometer 18 or the measurement potentiometer 22 for the balancing of the bridge 10. In addition to the control of the potentiometers 18 and 22, the servo-motor 38 may also provide for outputs from a pen recorder 100 and a numerical readout 102. The pen recorder may include a rate circuit 104 so as to provide for a reading of the rate of change of the optical density. Also, the numerical readout 102 may include arithmetic 106 which in turn is controlled by the timer 108 so as to provide for a reading of the change in optical density over a predetermined time interval as determined by the timer 108.

Figure 4:
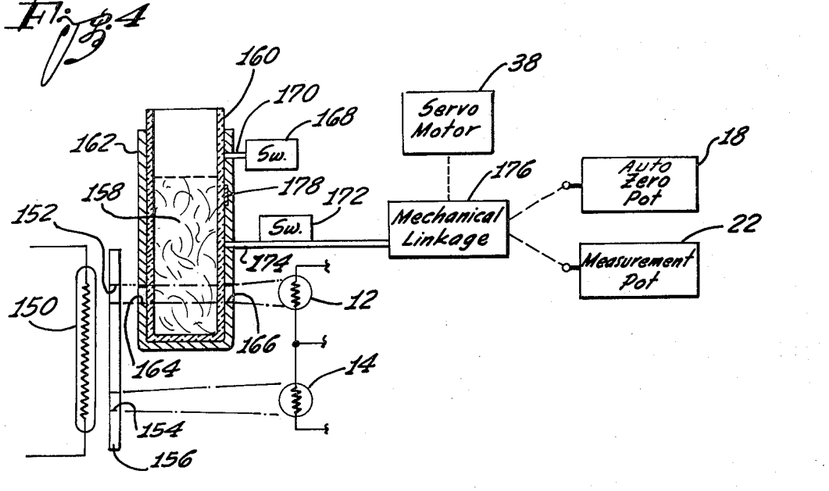
FIG. 4 is an illustration of a cuvette containing the specimen to be measured and with the cuvette received by a holder and also illustrates a portion of the measurement system of FIG. 1.

FIG. 4 illustrates the sequence of operations for the servo-motor 38 as the servo-motor balances the two potentiometers 18 and 22. In FIG. 4, a light source 150 provides light energy which passes through openings 152 and 154 in a plate 156. The light energy from the light source 150 is directed to the photoresistive cells 12 and 14. As can be seen in FIG. 4, photoresistive cell 12 is a measurement cell, whereas photoresistive cell 14 is a balance cell. For example, if the light energy from the light source 150 fluctuates, the fluctuations will impinge on both photoresistive cells 12 and 14 so as to produce corresponding changes in the resistance of the photoresistive cells in accordance with the fluctuations. These changes in resistance balance each other out in the bridge circuit 10 shown in FIG. 1.

The photoresistive cell 12, however, also receives light energy which is altered in accordance with the optical density of a specimen to be measured. For example, the specimen may consist of a liquid 158 containing various chemicals which is contained in a cuvette 160. The cuvette would usually be constructed of a material such as glass. The cuvette 160 is positioned in a holder 162 which is designed to have an inside configuration corresponding to the outside configuration of the cuvette so as to receive the cuvette 160. The holder 162 has openings 164 and 166 which allow for the passage of the light energy to the photoresistive cell 12.

The system of FIG. 4 also includes an on-off switch 168 which is controlled by a rod 170 extending into the holder 162. A second switch 172 is also controlled by a rod 174 extending into the holder 102. The rod 174 also controls the mechanical linkage 176. The interior of the holder 162 also includes a piece of friction material 178 which prevents the cuvette 160 from sliding rapidly into the holder 162.

The system of FIG. 4 operates in the following manner: As the cuvette 160 is initially inserted in the holder 162, the cuvette initially engages the rod 170 to push the rod 170 and close the switch 168. The switch 168 controls the power to the system of FIG. 1 and when the system is turned on, the output from the bridge 110 produces a signal to control the servo-motor 38. The servo-motor 38 is initially connected by a mechanical linkage 176 to control the zero potentiometer 18 or, as indicated above, a mechanical shutter may be used in place of the potentiometer 18. The servo-motor 38, therefore, balances the resistance bridge 10 by positioning the arm of the potentiometer 18 so as to provide for a zero balance in the bridge.

During the zero balance using the potentiometer 18 the light energy on the photocells 12 and 14 is substantially the same since the cuvette 160 has not been fully positioned within the holder 162. Also, during the zero balance using the potentiometer 18 the bridge 10 is in the position illustrated in FIG. 1 so that the potentiometer 20 is connected in the circuit. The potentiometer 20 is adjusted to have a resistance value to represent the difference between air and water and the potentiometer 20 is used so as to have the zero balance of the bridge 10 for a condition when the cuvette would contain pure water.

As the cuvette 160 is pushed into the holder 162, the friction material 178 prevents the cuvette from rapidly sliding. When the cuvette 160 is fully positioned in the holder, the rod 178 has been actuated to control the switch 172 and the mechanical linkage 176. The switch 172 connects the measurement potentiometer 22 into the bridge circuit in place of the compensating resistor 20. The mechanical linkage 176 mechanically switches the servo-motor 38 to control the measurement potentiometer 22 in place of the zero potentiometer 18. The measurement system of the present invention now provides for a balance of the resistance bridge 10 through the control of the measurement potentiometer 22 by the servo-motor 38. Since the imbalance of the bridge 10 is in accordance with the resistance of the photoresistive cell 12 which in turn is controlled by the optical density of the specimen 158, the position of the measurement potentiometer 22 after balance represents the optical density of the specimen 158.

Figure 5:
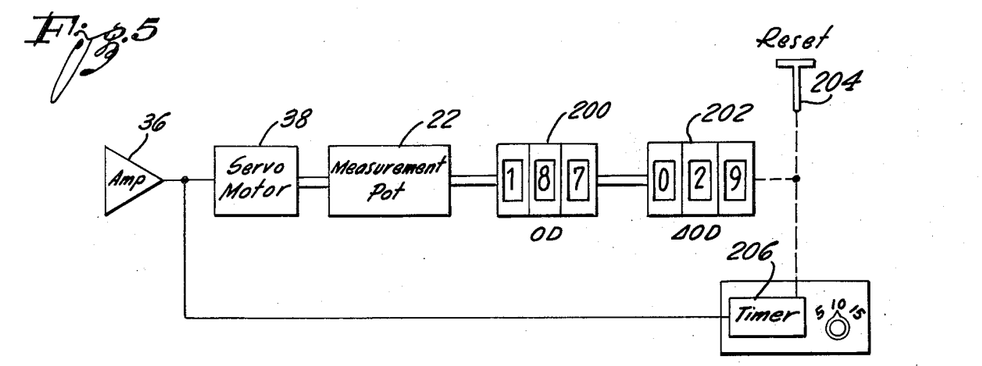
FIG. 5 is an illustration of an embodiment of the invention which provides for a readout of the optical density of the specimen and the change in optical density over a predetermined time interval.

FIG. 5 illustrates the servo-motor 38 controlling the measurement potentiometer 22 so as to provide for a balance in the bridge 10. At the same time the servo-motor 38 controls the measurement potentiometer 22, the servo-motor may also control a digital counter 200. Also, the position of the arm of the potentiometer 22 can be represented by an output reading from the digital counter 200. The servo-motor 38 may control a second counter 202 which is set to represent the change in the optical density of the specimen over a predetermined time interval. The measurement of the change in the optical density may be accomplished using a reset mechanism 204 and a timer 206.

After the specimen has been inserted to the position shown in FIG. 4, the reset button 204 may be pushed so as to reset the counter 200 to zero. At the same time, the timer 206 may be set to a predetermined time interval. The changes in the optical density are now reflected by the change in the reading of the counter 202 since the counter 202 starts from a zero position. When the timer 206 measures the predetermined time interval, the signals to the servo-motor 38 are interrupted by the timer 206 and the value of the counter 200 represents the final value of the optical density before the signals to the servo-motor 38 were interrupted and the value of the counter 202 represents the difference in the optical density over the predetermined time interval. The system of FIG. 5 as shown works for a change in the optical density when the change is always in the same direction. It is to be appreciated that manually controlled reversal gears may be employed between the counters 200 and 202 so that readings of the change in optical density in both directions may be controlled by the manual adjustment of the reversing gears. An electrical reversing switch may also be used, as well as electrical or mechanical scale change.

Figure 6:
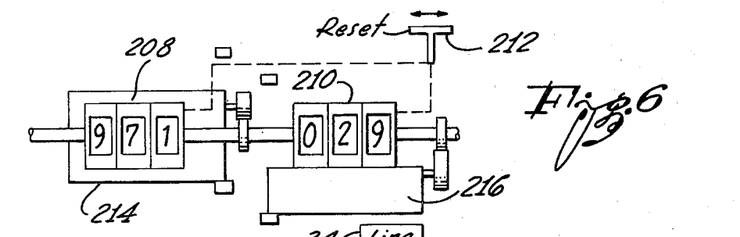
FIG. 6 is another construction for the embodiment of FIG. 5 and which provides for the readout of the change in optical density over the predetermined time interval for changes of the optical density in either a plus or minus direction.

FIG. 6 illustrates an alternative structure for the counter 202 of FIG. 5. In FIG. 6, a pair of counters 208 and 210 are coupled together and both counters can operate in either direction. The counters 208 and 210 provide for opposite direction readings in that one counter provides for increasing values for clockwise rotations while the other counter provides for increasing values for counterclockwise rotations. A reset button 212 controls both counters so as to reset them to zero. The counters 208 and 210 also include a pair of screens 214 and 216 which are coupled to the common shaft which drives the counters 208 and 210. As the shaft starts to rotate after the counters have been reset by the reset button 212, one or the other of the screens 214 and 216 is rotated to block the view of a particular one of the counters. The particular screen which shields the view of the counter is in accordance with the direction of rotation of the common shaft. Stops are provided so that further rotation of the shaft does not produce any further rotation of the screens. The screens 214 and 216 lightly engage the shaft through a friction wheel so that further rotations of the shaft produce slippage once the stops are engaged. The appropriate counter is visible to the operator of the measurement system of the present invention whereas the other counter is covered by the screen. In the specific showing of FIG. 6, counter 208 is hidden by the screen 214 whereas the counter 210 is exposed to the operator of the measurement system.

Figure 7:
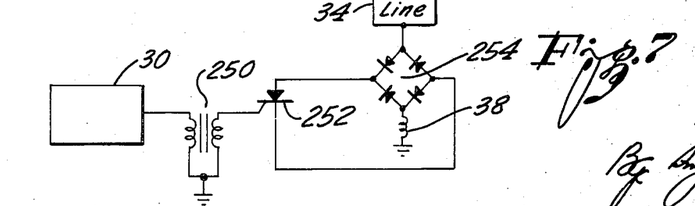
FIG. 7 is a circuit for driving the servo-motor which is shown in FIG. 5.

In the use of a system such as shown in FIGS. 5 and 6, the servo-motor 38 is a bidirectional motor. FIG. 7 illustrates a specific circuit for driving the bidirectional motor. In FIG. 7 the phase control modulator 30 is shown to be coupled through a transformer 250 to a silicon controlled rectifier 252. As illustrated in FIG. 2(g), the output from the phase control modulator is a pulse signal having a position in accordance with the amplitude and polarity of the output signal from the bridge circuit of FIG. 1. The pulse signal controls the silicon controlled rectifier 252 to fire at the appropriate time. The silicon controlled rectifier 252 in turn controls the coupling of power from the line voltage 34 through a diode bridge 254. The silicon controlled rectifier 252 and the diode bridge 254 may actually constitute the synchronous demodulator 32 of FIG. 1.

As can be seen in FIG. 7, the diode bridge 254 has four diodes poled in particular directions so as to allow for the passage of either positive or negative current from the line 34 to the servo-motor as represented by the winding 38. The position of the pulses supplied by the phase control modulator 30 determines the firing time of the silicon controlled rectifier 252. The firing time of the silicon controlled rectifier 252 determines whether the firing is during the positive or negative portion of the alternating signal from the line 34 and also determines the power delivered to the servo-motor 38. In either case, current is supplied to the servo-motor 38 as shown in FIG. 2(f). The current supplied to the servo-motor 38, therefore, allows for a bidirectional operation of the motor 38.

Figures 8, 9, 10:
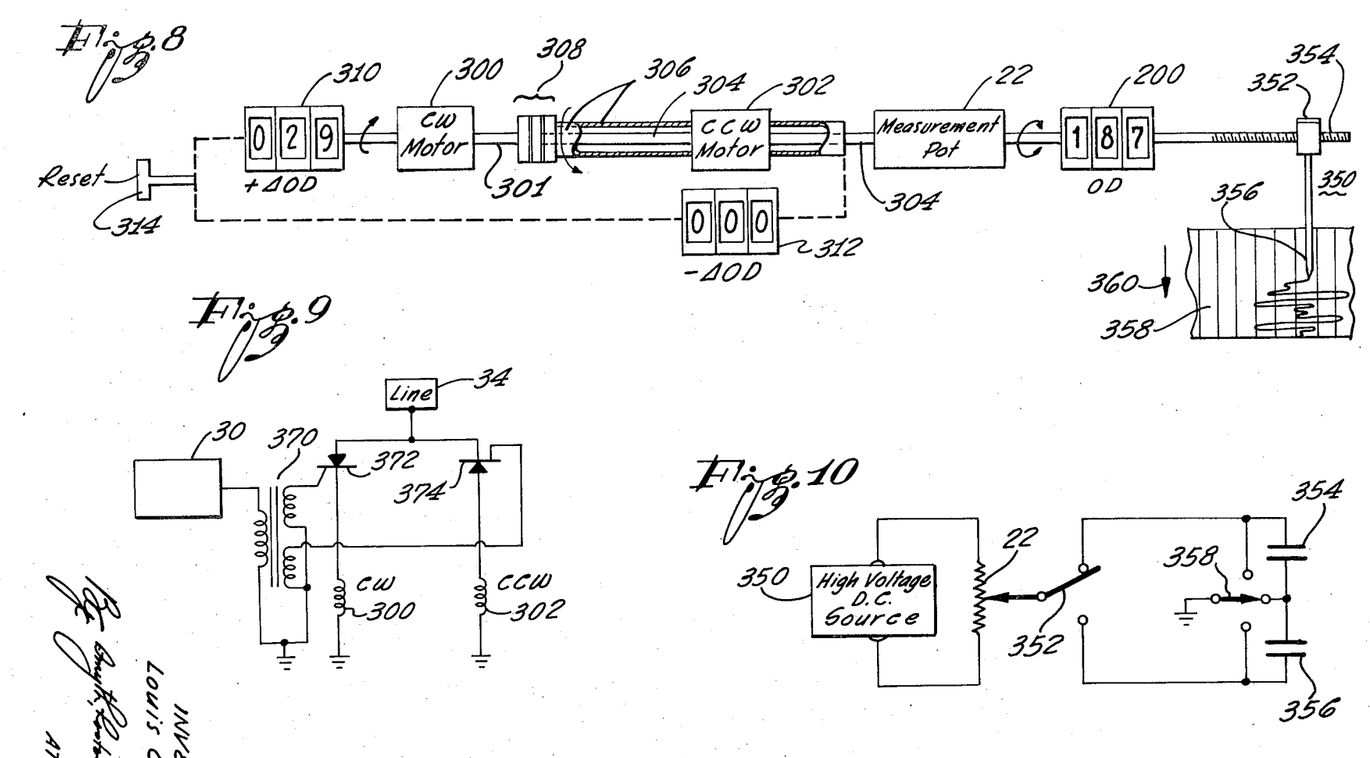
FIG. 8 is an alternative embodiment to that of FIGS. 5 and 6 for providing an output reading of optical density and change in output density in either a plus or minus direction and additionally including a pen recorder.
FIG. 9 is a schematic of a circuit for driving the servo-motors of FIG. 8.
FIG. 10 is a circuit for storing information from the measurement circuit of FIG. 1.

FIG. 8 illustrates an alternative construction to that shown in FIGS. 5 and 6 so as to produce an output indication in accordance with the optical density of the specimen and, in addition, produce an output indication in accordance with the change in optical density, either plus or minus, over a predetermined time interval. In FIG. 8, a pair of motors 300 and 302 take the place of the single motor 38 in FIG. 5. Motor 300 operates only in a clockwise direction while motor 302 operates only in a counter-clockwise direction.

Motor 300 drives a shaft 301 whereas motor 302 drives a shaft 306. The two shafts are interconnected by a spring clutch 308. The motors 300 and 302 individually drive the counters 310 and 312, whereas counter 310 may be used to provide for a measurement of the change in optical density over a predetermined time interval in the plus direction, whereas counter 312 provides for the measurement of the change in optical density over the predetermined time interval in the minus direction. The plus direction of change is produced by the clockwise rotation, whereas the minus direction of change is produced by the counter-clockwise rotation.

The spring clutch 308 allows the shaft 301 to be coupled through so as to control the measurement potentiometer 22. However, rotations of the shaft 301 are not transmitted to the shaft 306 since the clutch 308 disconnects these shafts. In the alternative operation, when the shaft 306 rotates, the rotation of the shaft 306 is coupled through so as to control the measurement potentiometer 22 while the shaft 306 is disconnected from the shaft 400 by the clutch 308. The measurement potentiometer 22, therefore, receives both clockwise and counterclockwise rotations.

Also coupled to the measurement potentiometer 22 is the counter 200 which is used to provide an output indication of the total optical density. The arrangement of the measurement potentiometer 22 and counter 200 is similar to that shown in FIG. 5. The counters 310 and 312 may also be reset by the reset button 314 and it is to be appreciated that a timer such as a timer shown in FIG. 5 may be included so as to disconnect the power from the motors when a predetermined time interval has elapsed after having been started by the reset button 314.

The embodiment of FIG. 8 also includes a pen recorder 350. The pen recorder includes a follower 352 which moves in response to a threaded end 354 of the shaft which controls the measurement potentiometer 22 and the counter 200. Supported on the follower 352 is a pen 356. The pen 356 provides for the marking of a sheet of paper 358, such as graph paper. The paper 358 is moved in a direction as shown by the arrow 360. As the paper 358 is moved, the pen graphically records the position of the follower 352 which is varying in accordance with the optical density of the specimen.

FIG. 9 illustrates a schematic of a circuit for driving the motors 300 and 302 of FIG. 8. The motors 300 and 302 are represented by the windings 300 and 302 in FIG. 9. In FIG. 9, the phase control modulator 30 produces the pulse signal as shown in FIG. 2(d). The pulse signal is passed through a transformer 370 having a pair of output windings to a pair of silicon-controlled rectifiers 372 and 374. The rectifiers 372 and 374 control the passage of the line voltage 34 to the motor windings 300 and 302. The pulses coupled to the silicon-controlled rectifiers 372 and 374 control the current flow to the motors from the line 34 and provide for the current flow of a particular quantity in accordance with the position of the pulse in relation to the amplitude of the corresponding position of the alternating signal from the line voltage 34. Therefore, when the pulses appear they allow either the rectifier 372 or the rectifier 374, which are poled in opposite directions, to pass current to one of the motor windings. The appropriate motor is, therefore, driven in accordance with the desired positioning of the measurement potentiometer 22 so as to produce a balance in the bridge circuit shown in FIG. 1. It is to be appreciated that the pen recorder 350 shown in FIG. 8 may also be used with the embodiment shown in FIG. 5 so that the embodiment shown in FIG. 5 could provide a graphic record of the optical density of the specimen.

Figure 11:
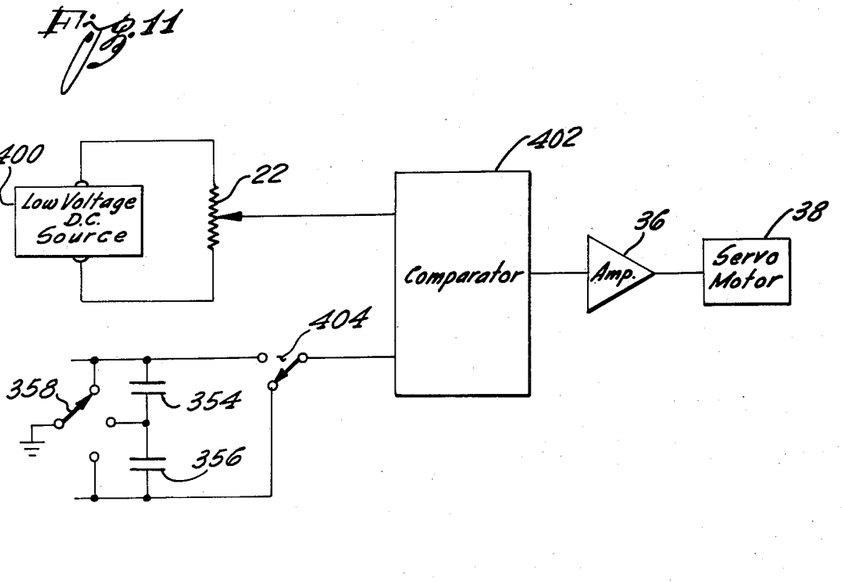
FIG. 11 is a circuit illustrating the use of the stored information of FIG. 10 so as to provide for an indication of the rate of change of the optical information.
Figure 12:
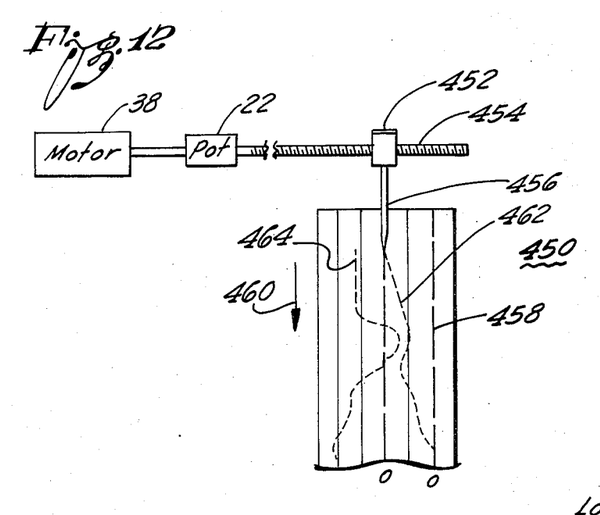
FIG. 12 illustrates the operation of the pen recorder used with the measurement system incorporating the circuits of FIGS. 10 and 11 for recording both optical density and rate of change of optical density.

FIGS. 10, 11 and 12 illustrate a system which may be used in conjunction with the embodiments of FIGS. 5 and 8 so as to provide for a graphic record of the rate of change of the optical density. As indicated before, it is often very important to know the rate of change of the optical density and for some type of measurements the rate of change is the critical measurement and when the rate of change stabilizes, the specimen may be removed and a new specimen inserted. This can speed up the process of checking individual specimens, since it is not necessary to test the specimen for a long period of time but only until the rate of change stabilizes.

In FIG. 10 a storage system is shown for storing the information as determined by the position of the measurement potentiometer 22. In FIG. 10 the measurement potentiometer 22 is removed electrically from the bridge 10 shown in FIG. 1 and has a high voltage d.c. source 350 connected across the potentiometer. The output arm of the potentiometer 22 is connected through a switch 352 to a pair of low leakage storage capacitors 354 and 356. The high voltage source 350 may merely be a voltage significantly higher than the voltage of the d.c. voltage source 24 shown in FIG. 1. This is so the output from the potentiometer 22 is significantly greater than the voltage across the potentiometer 22 when it is in the position shown in FIG. 1.

The capacitors 354 and 356 are connected together at one terminal and during the storage time this center terminal is connected to a reference potential such as ground through a switch 358. As can be seen in FIG. 10, and with the switches 352 and 358 in the position shown, the capacitor 354 is receiving a charge in accordance with the position of the variable arm of the potentiometer 22. The potentiometer 22, of course, acts as a voltage divider and the position of the arm determines the voltage to be applied to the capacitor.

After a predetermined period of time and after the potentiometer 22 has been reconnected in the bridge 10 and used to rebalance the bridge 10 for a new reading of the optical density, the switch 352 is moved to the other position so that the capacitor 356 is charged with a voltage proportional to the new position of the arm of the potentiometer 22. The voltage across the capacitors 354 and 356 when the switch 358 is in a position other than that shown in FIG. 10 represents the difference in potential between the capacitors 354 and 356 which in turn represents the difference in the position of the arm of the potentiometer 22 over a predetermined time interval. The difference in potential is the rate of change of the position of the arm of the potentiometer 22 which in turn represents the rate of change of the optical density of the specimen.

FIG. 11 illustrates a system for using the information stored by the circuit of FIG. 10 to produce an output control of the servo-motor such as the servo-motor 38 of FIG. 5. In FIG. 11, the high-voltage d.c. source 350 shown in FIG. 10 is removed and a low-voltage d.c. source 400 is connected across the potentiometer 22. Actually, the low-voltage d.c. source may be the d.c. voltage source 24 shown in FIG. 1. The output from the arm of the potentiometer 22 is fed to a comparator 402 which may be a synchronous modulator. In the illustration shown in FIG. 11, the switch 358 is connected so as to ground one side of the capacitor 354. A second switch 404 is connected so as to couple the potential across the capacitors 356 and 354 to the comparator 402.

The comparator 402 produces a signal in accordance with the difference in voltage between the output from the potentiometer 22 and the switch 404 and this output signal from the comparator 402 is fed to the servo-amplifier 36. The servo-amplifier 36 controls the motor 38 in accordance with the output signal from the comparator 402. The servo-motor 38 is mechanically coupled back to the potentiometer 22 to control the arm of the potentiometer 22 so as to produce a balance between the voltages from the potentiometer 22 and the switch 404. The balanced position of the potentiometer 22 is now in accordance with the rate of change of the optical density, since the output from the switch 404 is in accordance with the rate of change. The circuit of FIG. 11 makes periodic measurements and for the next measurement the switch 404 is connected to the position other than that shown in FIG. 11 so that one terminal of the capacitor 356 is connected to the reference potential such as ground.

In the actual sequence of operations of the entire measurement system as shown in FIGS. 1 through 12, the system first measures the optical density of the specimen by the system of FIG. 1 for a predetermined period of time, for example, 5 seconds. The measurement system is then switched to the structure as shown in FIG. 10 so that a high voltage source 350 produces an output from the arm of the potentiometer 22 so as to charge one or the other of the capacitors 354 and 356. This can be done quite rapidly, for example, in a period of time less than ½ second. The measurement system is then switched to the structure shown in FIG. 11 so that the output from the capacitors 354 and 356 is used to control the repositioning of the arm of the potentiometer 22. Since the voltage across the capacitors 356 and 354 is in accordance with the rate of change of the optical density of the specimen, the arm of the potentiometer 22 is, therefore, repositioned in accordance with the rate of change. The measurement system may be maintained in the position shown in FIG. 11 for a period of time such as 5 seconds.

The output from the total system may be seen with reference to FIG. 12. In FIG. 12 the motor 38 controls the potentiometer 22 and may also control various counters as described above with reference to the embodiments of FIGS. 5 and 8. In addition, the servo-motor 38 controls a pen recorder 450. The pen recorder 450 is essentially similar to the pen recorder 350 of FIG. 8. The pen recorder includes a follower arm 452 which is driven off of a threaded end 454 of the shaft of the motor 38. As the shaft rotates, the position of a pen 456 is moved across a sheet of paper 458, such as graph paper. The paper 458 is moved in the direction shown by the arrow 460.

The pen recorder 450 makes two graphic records 462 and 464 using the single pen 456. It can be seen that both graphic records 462 and 464 are composed of short dashes or dots and the dashes alternate between the graphic records 462 and 464. The graphic record 462 may represent the optical density of the specimen whereas the graphic record 464 may represent the rate of change of the optical density of the specimen.

Each time the system is switched to the structure shown in FIG. 1, a dash is recorded by the pen 456 in accordance with the optical density. As indicated above, this recorder may last 5 seconds and the graphic record appears as a short dash or dot since the paper is moved at a relatively slow speed. The system is then switched to the configuration shown in FIG. 10 so as to provide the storage explained above. Finally, the system is switched to the configuration shown in FIG. 11 so as to provide a reading of the rate of change of the optical density. When the reading of the rate of change of the optical density is made, the servo-motor 38 is controlled so that the pen recorder 450 produces a second series of short dashes or dots which form the graphic record 464. As indicated above, the dashes in the records 462 and 464 alternate as the system alternates between the states shown in FIGS. 1, 10 and 11. The system, therefore, uses a single pen recorder to produce both graphic records. Light trace marks may be found interconnecting the graphic records 462 and 464, but the ordinary pen recorders used to provide this type of record do not write very well when moving at rapid speeds. The tracings between the records 462 and 464 will be relatively light compared to the markings constituting the records 462 and 464.

The present invention, therefore, relates to a system for providing a reading of the optical density of a specimen, the change in optical density of the specimen over a predetermined period of time and also a graphic record of the optical density and the rate of change of the optical density. The system of the present invention uses an electrical resistance bridge measuring circuit and includes a servo-system to automatically balance the bridge and provide for the reading of optical density. The system of the present invention also includes means for automatically providing a zero balance of the system as the specimen is inserted into and removed from a specimen holder. The automatic zero balance alleviates the tedious requirement of balancing the bridge with water or other "blank" each time before use.

The measurement system of the present invention is relatively simple and inexpensive when compared with prior art measuring systems, and the present invention provides for a high degree of reliability and sophistication in the type of information presented to the operator of the equipment. It is to be appreciated that the invention has been illustrated with reference to particular embodiments and that variations and modifications may be made. The invention, therefore, is only to be limited by the appended claims.

I claim:

1. Apparatus for measuring the optical density of a specimen, comprising:
   a. a source of light energy disposed adjacent to the specimen to radiate a beam of light through the specimen to produce output light energy having an intensity in accordance with the optical density of the specimen and with the intensity of the output light energy varying non-linearly in accordance with linear changes in optical density;
   b. a photoresistive cell responsive to the output light energy and with the photoresistive cell having a resistance that varies non-linearly in response to the intensity of the output light energy to have a linear change in resistance in accordance with a linear change in optical density;
   c. a measurement system coupled to the photoresistive cell and including a variable means, said measurement system producing an output signal having a value in accordance with the resistance of the photoresistive cell;
   d. servo control means responsive to the output signal from said measurement system and coupled to said variable means in accordance with the value of said output signal to balance said measurement system when said specimen is located between said light source and said photoresistive cell;
   e. first means coupled to the output of and controlled by said control means for producing a first output indication in accordance with the resistance of the photoresistive cell to indicate the optical density of said specimen; and
   f. second means coupled to the output of and controlled by said control means for producing a second output indication in accordance with the difference between a first resistance value of the photoresistive cell and a second resistance value of the photoresistive cell and with the first and second resistance values measured over a predetermined time interval to indicate the change in optical density of said specimen.

2. Apparatus as defined in claim 1 in which said second means includes means for indicating whether said second resistance value is greater or less than said first resistance value, and said control means couples said first and second means to said measurement system, the balancing of said measurement system by said control means automatically producing said output indications of said first and second means.

3. An optical densitometer for measuring the optical density of a specimen at a predetermined wavelength, including the combination of:
   a. a bridge circuit having four electrically separate sides,
   b. a first photoresistive cell disposed in a first side of said bridge circuit and having a resistance that varies as a predetermined nonlinear function of the intensity of the light incident thereon,
   c. a second photoresistive cell disposed in a second side of said bridge circuit and having a resistance that varies as a predetermined nonlinear function of the intensity of the light incident thereon.
   d. a source of light effective to radiate first and second separate beams of light and said wavelength onto said first and second photoresistive cells, respectively,
   e. means for positioning said specimen between said light source and said first photoresistive cell whereby the light beam incident upon said first photoresistive cell has an intensity which differs from the intensity of the light incident upon said second photoresistive cell by an amount that is a function of the optical density of said specimen at said wavelength.
   f. resistance means disposed in a third side of said bridge circuit and variable through a range of resistance effective to balance said bridge circuit,
   g. control means coupled to the resistance means and operatively responsive to the amount of unbalance present in said bridge as a result of the difference in the resistance of said photoresistive cells for automatically varying the resistance means to balance the bridge, and
   h. indicating means coupled to said resistance means, said indicating means being linearly calibrated in units of optical density and indicating the change in resistance of said resistance means which is required to balance the bridge.

4. The optical densitometer of claim 3 including additional indicating means coupled to the control means and responsive to the change in unbalance in said bridge over a period of time to indicate the rate of change of the optical density over a period of time.

5. The optical densitometer of claim 4 wherein the additional indicating means includes a pair of counters driven by a bi-directional motor.

6. The optical densitometer of claim 4 wherein the additional indicating means includes a pair of counters each driven by a unidirectional motor of opposite rotation than the other and with the motors arranged along a common shaft and interconnected by a clutch to allow for rotational transmission to only one of the pair of counters for each direction of rotation.

7. An optical densitometer for measuring the rate of change of a specimen at a predetermined wavelength, including the combination of:
   a. a bridge circuit having four electrically separate sides,
   b. a first photoresistive cell disposed in a first side of said bridge circuit and having a resistance that varies as a predetermined nonlinear function of the intensity of the light incident thereon,
   c. a second photoresistive cell disposed in a second side of said bridge circuit and having a resistance that varies as a predetermined nonlinear function of the intensity of the light incident thereon,
   d. a source of light effective to radiate first and second separate beams of light and said wavelength onto said first and second photoresistive cells, respectively,
   e. means for positioning said specimen between said light source and said first photoresistive cell whereby the light beam incident upon said first photoresistive cell has an intensity which differs from the intensity of the light incident upon said second photoresistive cell by an amount that is a function of the optical density of said specimen at said wavelength.
   f. resistance means disposed in a third side of said bridge circuit and variable through a range of resistance effective to balance said bridge circuit,
   g. control means coupled to the resistance means and operatively responsive to the amount of unbalance present in said bridge as a result of the difference in the resistances of said photoresistive cells for automatically varying the resistance means to continually balance the bridge over a predetermined period of time, and
   h. indicating means coupled to said resistance means said indicating means being linearly calibrated in units of rate of change of optical density and indicating the rate of change in resistance of said resistance means which is required to balance the bridge over the predetermined period of time.

8. The optical densitometer of claim 7 wherein the indicating means includes a pair of counters driven by a bi-directional motor.

9. The optical densitometer of claim 7 wherein the indicating means includes a pair of counters each driven by a unidirectional motor of opposite rotation than the other and with the motors arranged along a common shaft and interconnected by a clutch to allow for rotational transmission to only one of the pair of counters for each direction of rotation.

10. The optical densitometer of claim 7 additionally including means for storing the measurement of the rate of change of optical density and including a pair of capacitors having a common terminal connected together to a reference and with first one and then after the predetermined time, the other of the capacitors connected to a source of potential representative of the unbalance in the bridge to provide a voltage difference across the pair of capacitors representing the rate of change.

11. An optical densitometer for measuring the optical density of a specimen at a predetermined wavelength, including the combination of:
   a. a bridge circuit having four electrically separate sides,
   b. a first photoresistive cell disposed in a first side of said bridge circuit and having a resistance that varies as a predetermined nonlinear function of the intensity of the light incident thereon,
   c. a second photoresistive cell disposed in a second side of said bridge circuit and having a resistance that varies as a predetermined nonlinear function of the intensity of the light incident thereon,
   d. a source of light effective to radiate first and second separate beams of light and said wavelength onto said first and second photoresistive cells, respectively, e. means for positioning said specimen between said light source and said first photoresistive cell whereby the light beam incident upon said first photoresistive cell has an intensity which differs from the intensity of the light incident upon said second photoresistive cell by an amount that is a function of the optical density of said specimen at said wavelength and with the means for positioning providing a first signal representing when the specimen is not within the light beam and a second signal representing when the specimen is within the light beam, f. resistance means disposed in a third side of said bridge circuit and variable through a range of resistance effective to balance said bridge circuit, g. control means coupled to the resistance means and operatively responsive to the amount of unbalance present in said bridge as a result of the difference in the resistance of said photoresistive cells for automatically varying the resistance means to balance the bridge, and with the control means initially zeroing the bridge in response to the first signal and then balancing the bridge in response to the second signal to measure the optical density, and h. indicating means coupled to said resistance means, said indicating means being linearly calibrated in units of optical density and indicating the change in resistance of said resistance means which is required to balance the bridge after the bridge has been automatically zeroed.

12. The optical densitometer of claim 11 wherein the means for positioning the specimen includes a holder to receive the specimen and with switches activated in accordance with the position of the specimen in the holder to provide the first and second signals.

* * * * *